US012700249B2

(12) United States Patent
Kobayashi et al.

(10) Patent No.: US 12,700,249 B2
(45) Date of Patent: Aug. 4, 2026

(54) SYSTEMS AND METHODS FOR TRAINING MACHINE LEARNING ON NOISY AND INACCURATE IMMUNOSTAINS

(71) Applicant: PICTOR LABS, INC., Los Angeles, CA (US)

(72) Inventors: Hirofumi Kobayashi, Los Angeles, CA (US); Yair Rivenson, Los Angeles, CA (US); Luis Carvalho, Valencia, CA (US)

(73) Assignee: Pictor Labs, Inc., Los Angeles, CA (US)

( * ) Notice: Subject to any disclaimer, the term of this patent is extended or adjusted under 35 U.S.C. 154(b) by 300 days.

(21) Appl. No.: 18/348,188

(22) Filed: Jul. 6, 2023

(65) Prior Publication Data

US 2025/0014365 A1 Jan. 9, 2025

(51) Int. Cl.
*G06V 20/69* (2022.01)
*G06T 5/20* (2006.01)
(Continued)

(52) U.S. Cl.
CPC .............. *G06V 20/695* (2022.01); *G06T 5/20* (2013.01); *G06T 5/50* (2013.01); *G06T 5/70* (2024.01);
(Continued)

(58) Field of Classification Search
CPC ...... G06V 20/695; G06V 10/30; G06V 10/82; G06V 10/772; G06T 5/20; G06T 5/50;
(Continued)

(56) References Cited

U.S. PATENT DOCUMENTS 6,187,289 B1 2/2001 Richards-Kortum et al.
9,971,966 B2 5/2018 Nelson et al.
(Continued)

FOREIGN PATENT DOCUMENTS

CA 3102297 A1 12/2019
CN 1556379 A 12/2004
(Continued)

OTHER PUBLICATIONS

Ghahremani, Parmida, et al. "Deep learning-inferred multiplex immunofluorescence for immunohistochemical image quantification." Nature machine intelligence 4.4 (2022): 401-412. (Year: 2022).*

(Continued)

*Primary Examiner* — Andrae S Allison
(74) *Attorney, Agent, or Firm* — Cooley LLP

(57) ABSTRACT

A method for refining virtually-stained image annotations. The method includes separating an image of a stained tissue section into an image of a counterstain and an image of immunostaining visual signals via linear transformation. The method includes identifying and segmenting nuclei in the image of the counterstain to produce an image of a refined counterstain with single-cell segments. The method includes comparing immunostaining visual signals in the single-cell segments of the image of the refined counterstain to a user-defined threshold to determine true positive cells. The method includes refining the image of the immunostaining visual signals to produce an image of refined immunostaining visual signals. The refining is based on the stained tissue section protein localization or morphology and the determined true positive cells. The method includes overlaying the image of the counterstain and the image of refined immunostaining visual signals to produce a refined virtually-stained image annotation.

18 Claims, 9 Drawing Sheets

100

▨ Color for 100 Hematoxylin
▧ Color for 100 Hematoxylin
▨ Color for 100 DAB

(51) Int. Cl.

| | | |
|---|---|---|
| *G06T 5/50* | (2006.01) | |
| *G06T 5/70* | (2024.01) | |
| *G06V 10/30* | (2022.01) | |
| *G06V 10/82* | (2022.01) | |

(52) U.S. Cl.
CPC .............. *G06V 10/30* (2022.01); *G06V 10/82* (2022.01); *G06T 2207/20081* (2013.01); *G06T 2207/20084* (2013.01); *G06T 2207/30024* (2013.01)

(58) Field of Classification Search
CPC ............. G06T 5/70; G06T 2207/20081; G06T 2207/20084; G06T 2207/30024; G06T 7/0012; G06T 7/11
See application file for complete search history.

(56) References Cited

U.S. PATENT DOCUMENTS

| | | | |
|---|---|---|---|
| 10,795,315 | B2 | 10/2020 | Ozcan et al. |
| 10,824,847 | B2 | 11/2020 | Wu et al. |
| 10,838,192 | B2 | 11/2020 | Ozcan et al. |
| 10,871,745 | B2 | 12/2020 | Ozcan et al. |
| 11,222,415 | B2 | 1/2022 | Ozcan et al. |
| 11,262,286 | B2 | 3/2022 | Ozcan et al. |
| 11,354,804 | B1 | 6/2022 | Behrooz et al. |
| 11,403,735 | B2 | 8/2022 | Gao et al. |
| 11,455,753 | B1* | 9/2022 | Alemi ................... G06T 11/001 |
| 11,501,544 | B2 | 11/2022 | Ozcan et al. |
| 11,514,325 | B2 | 11/2022 | Ozcan et al. |
| 11,776,124 | B1 | 10/2023 | Behrooz et al. |
| 11,893,739 | B2 | 2/2024 | Ozcan et al. |
| 11,922,681 | B2* | 3/2024 | Nie ....................... G06F 18/231 |
| 12,106,552 | B2 | 10/2024 | Ozcan et al. |
| 12,300,006 | B2 | 5/2025 | Ozcan et al. |
| 12,327,362 | B2 | 6/2025 | Ozcan et al. |
| 2004/0093166 | A1 | 5/2004 | Kil |
| 2007/0020697 | A1* | 1/2007 | Cualing ........... G01N 33/57492 435/7.2 |
| 2009/0075282 | A1 | 3/2009 | Mahmood et al. |
| 2010/0128988 | A1 | 5/2010 | Kincaid |
| 2011/0074944 | A1 | 3/2011 | Can et al. |
| 2011/0206262 | A1 | 8/2011 | Sammak et al. |
| 2012/0083678 | A1 | 4/2012 | Drauch et al. |
| 2013/0044933 | A1 | 2/2013 | Kenny |
| 2013/0077875 | A1 | 3/2013 | Levenson et al. |
| 2013/0144714 | A1 | 6/2013 | Yuan et al. |
| 2013/0162800 | A1 | 6/2013 | Kim et al. |
| 2013/0317369 | A1 | 11/2013 | Bryant-Greenwood et al. |
| 2014/0221813 | A1 | 8/2014 | Bryant-Greenwood et al. |
| 2014/0270457 | A1 | 9/2014 | Bhargava |
| 2014/0375792 | A1 | 12/2014 | Yaqoob et al. |
| 2015/0050650 | A1 | 2/2015 | Seppo et al. |
| 2015/0119722 | A1 | 4/2015 | Kaneko |
| 2015/0153349 | A1* | 6/2015 | Galon .............. G01N 33/57492 435/7.23 |
| 2015/0226743 | A1 | 8/2015 | Weiss et al. |
| 2016/0018632 | A1 | 1/2016 | Gareau |
| 2016/0077007 | A1 | 3/2016 | Demos et al. |
| 2016/0196648 | A1 | 7/2016 | Madabhushi et al. |
| 2017/0052106 | A1 | 2/2017 | Hennig et al. |
| 2017/0168285 | A1 | 6/2017 | Ozcan et al. |
| 2017/0191937 | A1 | 7/2017 | Levenson et al. |
| 2017/0249548 | A1* | 8/2017 | Nelson ................... G06V 10/82 |
| 2017/0343477 | A1 | 11/2017 | Santori et al. |
| 2017/0343784 | A1 | 11/2017 | Wu et al. |
| 2017/0358082 | A1 | 12/2017 | Bhargava |
| 2018/0012356 | A1 | 1/2018 | Madabhushi et al. |
| 2018/0028079 | A1 | 2/2018 | Gurevich et al. |
| 2018/0064409 | A1 | 3/2018 | Schmidt-Richberg et al. |
| 2018/0239951 | A1 | 8/2018 | El-Zehiry et al. |
| 2018/0286038 | A1 | 10/2018 | Jalali et al. |
| 2018/0364240 | A1* | 12/2018 | Binnig ............... C07K 16/2827 |
| 2019/0188446 | A1 | 6/2019 | Wu et al. |
| 2019/0244681 | A1 | 8/2019 | Gurcan et al. |
| 2019/0251330 | A1 | 8/2019 | Cotte et al. |
| 2019/0266486 | A1 | 8/2019 | Yamada et al. |
| 2019/0294108 | A1 | 9/2019 | Ozcan et al. |
| 2019/0333199 | A1 | 10/2019 | Ozcan et al. |
| 2019/0384047 | A1 | 12/2019 | Johnson et al. |
| 2019/0392580 | A1 | 12/2019 | Kapil et al. |
| 2020/0066407 | A1 | 2/2020 | Stumpe et al. |
| 2020/0097701 | A1 | 3/2020 | Chukka et al. |
| 2020/0106932 | A1 | 4/2020 | Chou et al. |
| 2020/0123618 | A1 | 4/2020 | Batenchuk et al. |
| 2020/0167584 | A1 | 5/2020 | Guetter et al. |
| 2020/0183327 | A1 | 6/2020 | El-Zehiry et al. |
| 2020/0250794 | A1 | 8/2020 | Zimmer et al. |
| 2020/0340901 | A1 | 10/2020 | Ozcan et al. |
| 2020/0360538 | A1 | 11/2020 | Kossatz et al. |
| 2020/0372635 | A1 | 11/2020 | Veidman et al. |
| 2020/0394825 | A1 | 12/2020 | Stumpe et al. |
| 2021/0043331 | A1 | 2/2021 | Ozcan et al. |
| 2021/0150707 | A1* | 5/2021 | Weisenfeld ............ G16B 40/00 |
| 2021/0209337 | A1 | 7/2021 | Ozcan et al. |
| 2021/0264214 | A1 | 8/2021 | Ozcan et al. |
| 2021/0374381 | A1 | 12/2021 | Ozcan et al. |
| 2021/0382052 | A1 | 12/2021 | Joung et al. |
| 2022/0012850 | A1 | 1/2022 | Ozcan et al. |
| 2022/0058776 | A1 | 2/2022 | Ozcan et al. |
| 2022/0114711 | A1 | 4/2022 | Ozcan et al. |
| 2022/0122313 | A1 | 4/2022 | Ozcan et al. |
| 2022/0206434 | A1 | 6/2022 | Ozcan et al. |
| 2023/0030424 | A1 | 2/2023 | Ozcan et al. |
| 2023/0060037 | A1 | 2/2023 | Ozcan et al. |
| 2023/0085827 | A1 | 3/2023 | Ozcan et al. |
| 2023/0394716 | A1 | 12/2023 | De Haan et al. |
| 2024/0135544 | A1 | 4/2024 | Ozcan et al. |
| 2024/0290473 | A1 | 8/2024 | Ozcan et al. |
| 2025/0259462 | A1 | 8/2025 | Ozcan et al. |

FOREIGN PATENT DOCUMENTS

| | | |
|---|---|---|
| CN | 102575990 A | 7/2012 |
| CN | 107123137 A | 9/2017 |
| CN | 113989799 A | 1/2022 |
| EP | 2921990 A2 | 9/2015 |
| EP | 3776342 B1 | 1/2025 |
| JP | 2020530611 A | 10/2020 |
| JP | 2021032705 A | 3/2021 |
| JP | 2022504870 A | 1/2022 |
| WO | WO-2013187148 A1 | 12/2013 |
| WO | WO-2017053592 A1 | 3/2017 |
| WO | WO-2017196885 A1 | 11/2017 |
| WO | WO-2018165590 A1 | 9/2018 |
| WO | WO-2019046774 A1 | 3/2019 |
| WO | WO-2019103909 A1 | 5/2019 |
| WO | WO-2019118544 A1 | 6/2019 |
| WO | WO-2019154987 A1 | 8/2019 |
| WO | WO-2019191697 A1 | 10/2019 |
| WO | WO-2020018154 A1 | 1/2020 |
| WO | WO-2020102546 A1 | 5/2020 |
| WO | WO-2020139835 A1 | 7/2020 |
| WO | WO-2020219468 A1 | 10/2020 |
| WO | WO-2020242993 A1 | 12/2020 |
| WO | WO-2021133847 A1 | 7/2021 |
| WO | WO-2021188839 A1 | 9/2021 |
| WO | WO-2021198279 A1 | 10/2021 |
| WO | WO-2022256206 A1 | 12/2022 |
| WO | WO-2023283091 A1 | 1/2023 |
| WO | WO-2023107844 A1 | 6/2023 |
| WO | WO-2023187612 A1 | 10/2023 |
| WO | WO-2023194537 A1 | 10/2023 |
| WO | WO-2023239998 A1 | 12/2023 |

OTHER PUBLICATIONS

Stringer, C., et al., Cellpose: a generalist algorithm for cellular segmentation. Nat Methods 18, pp. 100-106 (2021).
Ruifrok, A. C., et al., "Quantification of histochemical staining by color deconvolution.," Analytical and quantitative cytology and

(56) References Cited

OTHER PUBLICATIONS histology / the International Academy of Cytology [and] American Society of Cytology, vol. 23, No. 4, pp. 291-299 (Aug. 2001).

Linear Map—Wikipedia, retrieved from internet via https://en.wikipedia.org/wiki/Linear_map on Apr. 25, 2023; 14 pgs.

Scikit-Image, retrieve from internet via https://github.com/scikit-image/scikit-image/blob/5e74a4a3a5149a8a14566b81a32bb15499aa3857/skimage/color/colorconv.py#L547 on Apr. 25, 2023; 41 pgs.

Gonzalez, R. C., et al., Digital Image Processing (4th ed.). Global Edition—Pearson (2018) ; 1022 pgs.

Hoechst 33342 is a bis-benzimide derivative that binds to AT-rich sequences in the minor grove of double-stranded DNA, Hoechst 33342—an overview | ScienceDirect Topics, Methods in Cell Biology (2011) www.siencedirect.com/topics/neuroscience/hoechst-33342; 13 pages.

Parra, Edwin R., et al., "Validation of multiplex immunofluorescence panels using multispectral microscopy for immune-profiling of formalin-fixed and paraffin-embedded human tumor tissues" Scientific Reports | 7: 13380, published online Oct. 17, 2017, www.nature.com/scientificreports, 11 pages.

3D View 264D Three-Dimensional Crystal Structure of the A-Tract DNA Dodecamer D(CGCAAATTTGCG) Complexed with the Minor-Groove-Binding Drug Hoechst 33258, rcsb.org retrieved from internet rcsb.org on May 12, 2023; 2 pgs.

Pachitariu, M., et al., "Cellpose 2.0: how to train your own model" Nature Methods, Dec. 2022, vol. 19, pp. 1634-1641.

Abadi et al., "TensorFlow: A system for large-scale machine learning" USENIX Association,12th USENIX Symposium on Operating Systems Design and Implementation (OSDI '16), Nov. 2-4, 2016, pp. 265-283.

Abels et al., "Computational Pathology Definitions, Best Practices, and Recommendations for Regulatory Guidance: a White Paper from the Digital Pathology Association" J Pathol. (Sep. 2019);249(3):286-294.

Amgad et al., "Report on computational assessment of Tumor Infiltrating Lymphocytes from the International Immuno-Oncology Biomarker Working Group" NPJ Breast Cancer (May 12, 2020); 6:16, 13 pages.

Badano et al., "Consistency and Standardization of Color in Medical Imaging: a Consensus Report" J Digit Imaging. (Feb. 2015);28(1):41-52.

Barbastathis et al., "On the use of deep learning for computational imaging" Optica (Jul. 2019); 6(8):921-943.

Bayramoglu et al., "Towards Virtual H&E Staining Of Hyperspectral Lung Histology Images Using Conditional Generative Adversarial Networks," Aug. 2017, IEEE, 2017 IEEE International Conference on Computer Vision Workshops (ICCVW), pp. 64-71.

Bejnordi et al., "Diagnostic Assessment of Deep Learning Algorithms for Detection of Lymph Node Metastases in Women with Breast Cancer" JAMA. (Dec. 12, 2017);318(22):2199-2210.

Bhattacharjee et al., "Cluster Analysis of Cell Nuclei in H&E-Stained Histological Sections of Prostate Cancer and Classification Based on Traditional and Modern Artificial Intelligence Techniques" Diagnostics (Dec. 12, 2021): 12:15, 23 pages.

Bishara et al., "Lensfree on-chip microscopy over a wide field-of-view using pixel super-resolution" Opt Express. (May 24, 2010); 18(11):11181-11191.

Borhani et al., "Digital Staining Through the Application of Deep Neural Networks to Multi-modal Multi-photon Microscopy," Biomedical Optics Express (Mar. 2019);10(3):1339-1350.

Burlingame et al., "Shift: speedy histopathological-to-immunofluorescent translation of whole slide images using conditional generative adversarial networks" Progress in Biomedical Optics and Imaging, SPIE—International Society for Optical Engineering, Bellingham, WA, US, vol. 10581, Mar. 6, 2018, pp. 1058105-1058105-7.

Calzavara-Pinton et al., "Reflectance Confocal Microscopy for in Vivo Skin Imaging" Photochem Photobiol. (Nov.-Dec. 2008); 84(6):1421-1430.

Champandard, "Semantic Style Transfer and Turning Two-bit Doodles into Fine Artworks" arXiv.org [online], Mar. 5, 2016, the [date of search Oct. 24, 2024], and https://arxiv.org/pdf/1603.01768, DOI:10.48550/arXiv.1603.01768, 7 pages.

Combalia et al., "Digitally Stained Confocal Microscopy through Deep Learning" Proceedings of Machine Learning Research (Jul. 2019); 102:121-129.

Croce et al., "Autofluorescence spectroscopy and imaging: a tool for biomedical research and diagnosis" European Journal of Histochemistry (Dec. 2014); 58:2461, 18 pages.

D'Alonzo et al., "Semantic segmentation of reflectance confocal microscopy mosaics of pigmented lesions using weak labels" Sci Rep. (Feb. 11, 2021); 11(1):3679, 13 pages.

De Haan et al., "Deep learning-based image reconstruction and enhancement in optical microscopy" IEEE (Jan. 2020); 108:30-50.

De Haan et al., "Deep Learning-based Transformation of H&E Stained Tissues into Special Stains" Nat Commun. (Aug. 12, 2021); 12(1):4884, 1-13.

Diao et al., "Human-interpretable Image Features Derived from Densely Mapped Cancer Pathology Slides Predict Diverse Molecular Phenotypes" Nat Commun. (Mar. 12, 2021); 12(1):1613, pp. 1-15.

Drezek et al., "Laser Scanning Confocal Microscopy of Cervical Tissue Before and After Application of Acetic Acid" Am J Obstet Gynecol. (May 2000); 182(5):1135-1139.

Dunstan, Robert W., et al., "The Use of Immunohistochemistry for Biomarker Assessment—Can It Compete with Other Technologies?" Toxicologic Pathology (Oct 2011); 39:988-1002.

Esteva et al., "Dermatologist-level Classification of Skin Cancer with Deep Neural Networks" Nature. (Feb. 2, 2017); 542(7639):115-118.

EP Application No. 19776693.4, Extended European Search Report mailed May 7, 2021; Applicant The Regents of the University of California; 7 pages.

EP Application No. 20905259.6, Extended European Search Report mailed May 12, 2023; Applicant The Regents of the University of California; 8 pages.

EP Application No. 22838254.5, Extended European Search Report mailed Oct. 4, 2024; Applicant The Regents of the University of California; 7 pages.

EP Application No. 24186806.6, Extended European Search Report mailed Nov. 4, 2024; Applicant Pictor Labs, Inc.; 15 pages.

EP Application No. 24223866.5, Extended European Search Report mailed Apr. 7, 2025; Applicant The Regents of the University of California; 8 pages.

Fereidouni et al., "Microscopy with ultraviolet surface excitation for rapid slide-free histology" Nat Biomed Eng. (Dec. 2017); 1(12):957-966.

U.S. Appl. No. 17/261,542, Final Office Action mailed Mar. 12, 2024; Inventor Ozcan, Aydogan et al.; 14 pages.

Forster et al., "Complex Wavelets for Extended Depth-of-field: a New Method for the Fusion of Multichannel Microscopy Images" Microsc Res Tech. (Sep. 2004); 65(1-2):33-42.

Fujitani et al., "Stain Conversion of Pathological Images by CNNs Learned by Using Datasets Considering Image Similarity", IEICE Technical Report, Nov. 6, 2017, vol. 117, No. 281, pp. 9-14 (with English Summary).

Gaiser et al., "Automated analysis of protein expression and gene amplification within the same cells of paraffin-embedded tumour tissue" Anal Cell Pathol (Amst). (Jan. 2010); 33(2):105-112.

Gareau, "Feasibility of digitally stained multimodal confocal mosaics to simulate histopathology" Journal of Biomedical Optics (May 2009); 14(3):034050, 6 pages.

Giacomelli et al., "Virtual Hematoxylin and Eosin Transillumination Microscopy Using Epi-Fluorescence Imaging" PLoS One (Aug. 2016); 11(8):e0159337, 13 pages.

Glaser et al., "Light-sheet microscopy for slide-free non-destructive pathology of large clinical specimens" Nat Biomed Eng. (Jul. 2017); 1(7):0084, 22 pages.

Goodfellow et al., Generative Adversarial Networks, Advances in Neural Information Processing Systems, http://www.github.com/goodfeli/adversarial, Jun. 10, 2014, pp. 2672-2680.

(56)  References Cited

OTHER PUBLICATIONS

Greenbaum et al., "Maskless imaging of dense samples using pixel super-resolution based multi-height lensfree on-chip microscopy" Opt Express. (Jan. 30, 2012); 20(3):3129-43.

Greenbaum et al., "Wide-field computational imaging of pathology slides using lens-free on-chip microscopy" Sci Transl Med. (Dec. 17, 2014); 6(267):267ra175, 10 pages.

Guha Balakrishnan et al., "VoxelMorph: A Learning Framework for Deformable Medical Image Registration" arXiv:1809.05231v2 [cs.CV] Jan. 17, 2019 (16 pages).

Haenssle et al., "Man Against Machine: Diagnostic Performance of a Deep Learning Convolutional Neural Network for Dermoscopic Melanoma Recognition in Comparison to 58 Dermatologists" Ann Oncol. (Aug. 1, 2018); 29(8):1836-1842.

Hamel et al., "Transfer Learning in MIR: Sharing Learned Latent Representations for Music Audio Classification and Similarity" Nov. 2013 International Society for Music Information Retrieval, 6 pages.

Han et al., "Transferring Microscopy Image Modalities with Conditional Generative Adversarial Networks," 2017 IEEE Conference on Computer Vision and Pattern Recognition Workshops (CVPRW), pp. 851-859 (Jul. 2017).

Hayat, "Super-Resolution via Deep Learning" arXiv:1706.09077v1 [cs.CV] Jun. 28, 2017 (33 pages).

He et al., "Deep Residual Learning for Image Recognition" IEEE Xplore (Dec. 2016); pp. 770-778.

He et al., "Deep Residual Learning for Image Recognition," [Online], Retrieved from the Internet: arXiv: 1512.03385v1 [cs.CV] , Dec. 2015, 12 pages.

He et al., "Identity Mappings in Deep Residual Networks" arXiv:1603. 05027v3 [cs.CV] Jul. 25, 2016, 15 pages.

Huang et al., "Machine Learning Based Single-frame Super-resolution Processing for Lensless Blood Cell Counting" Sensors (Basel). (Nov. 2, 2016);16(11):1836, 16 pages.

PCT Application No. PCT/US2022/035609, International Preliminary Report on Patentability mailed Jan. 18, 2024; Applicant The Regents of the University of California; 10 pages.

PCT Application No. PCT/US2019/025020, International Search Report and Written Opinion mailed Jun. 19, 2019; Applicant The Regents of the University of California; 7 pages.

PCT Application No. PCT/US2020/066708, International Search Report and Written Opinion mailed Mar. 17, 2021; Applicant The Regents of the University of California; 15 pages.

PCT Application No. PCT/US2022/035609, International Search Report and Written Opinion mailed Oct. 6, 2022; Applicant The Regents of the University of California; 11 pages.

PCT Application No. PCT/US2023/067335, International Search Report and Written Opinion mailed Sep. 26, 2023; Applicant Pictor Labs, Inc.; 8 pages.

Isola, P. et al., "Image-to-Image Translation with Conditional Adversarial Networks," arXiv:1611.07004v3 [cs.CV] Nov. 26, 2018, [Retrieved from the Internet: URL: https://arxiv.org/pdf/1611.07004.pdf], 17 pages.

Jamme et al., "Deep UV autofluorescence microscopy for cell biology and tissue histology" Biol Cell. (Jul. 2013); 105(7):277-288.

Ji et al., "Rapid, label-free detection of brain tumors with stimulated Raman scattering microscopy" Sci Transl Med. (Sep. 4, 2013); 5(201):201ra119, 23 pages.

Jin et al., "Deep Convolutional Neural Network for Inverse Problems in Imaging" IEEE Trans Image Process. (Sep. 2017); 26(9):4509-4522.

Jo et al., "Quantitative Phase Imaging and Artificial Intelligence: a Review" IEEE J. of Selected Topics in Quantum Electronics, vol. 25, No. 1, Jan./Feb. 2019 (14 pages).

Khan et al., "The Effect of Neural Network Architecture on Virtual H&E Staining: Systematic Assessment of Histological Feasibility" Patterns (May 2023);4(5):100725, 18 pages.

Kingma et al., "ADAM: A Method for Stochastic Optimization" arXiv:1412.6980v9 [cs.LG] Jan. 30, 2017, 15 pages.

Koivukoski et al., "Unstained Tissue Imaging and Virtual Hematoxylin and Eosin Staining of Histologic Whole Slide Images" Lab Invest. (May 2023); 103(5):100070, 12 pages.

Kose et al., "Segmentation of Cellular Patterns in Confocal Images of Melanocytic Lesions in Vivo via a Multiscale Encoder-decoder Network (MED-Net)" Med Image Anal. (Jan. 2021); 67:101841, 30 pages.

Ledig et al., "Photo-Realistic Single Image Super-Resolution Using a Generative Adversarial Network" IEEE Xplore (Nov. 2017); 4681-4690.

Li et al., "Biopsy-free in Vivo Virtual Histology of Skin Using Deep Learning" Light: Science & Applications (Dec. 2021); 10:233, 22 pages.

Liao et al., "Visual attribute transfer through deep image analogy" ACM Transactions on Graphics (May 2017); vol. 36, No. 4, Article No. 120, pp. 1-15.

Liu et al., "Deep Learning-based Super-resolution in Coherent Imaging Systems" Sci Rep. (Mar. 8, 2019); 9(1):3926, 13 pages.

Liu et al., "Detecting Cancer Metastases on Gigapixel Pathology Images" arXiv:1703.02442v2 [cs.CV] Mar. 8, 2017, 13 pages.

Lowe, "Distinctive Image Features from Scale-Invariant Keypoints" Accepted for publication in the International Journal of Computer Vision, Jan. 5, 2004, 28 pages.

Lu et al., "Label-free DNA imaging in vivo with stimulated Raman scattering microscopy" Proc Natl Acad Sci USA. (Sep. 15, 2015); 112(37):11624-11629.

Mao et al., "Least Squares Generative Adversarial Networks" arXiv:1611.04076v3 [cs.CV] Apr. 5, 2017 (16 pages).

Mcdaniel, Andrew S., MD., et al., "Immunohistochemical Staining Characteristics of Nephrogenic Adenoma Using he PIN—Cocktail (p63, AMACR, and CK903) and GATA-3" Am. J. Surg. Pathol., Dec. 2014; vol. 38, No. 12, pp. 1664-1671.

Miyato et al., "Spectral Normalization for Generative Adversarial Networks" arXiv:1802.05957v1 [cs.LG] Feb. 16, 2018, 26 pages.

Monici, "Cell and tissue autofluorescence research and diagnostic applications" Biotechnol Annu Rev. (Jul. 2005); 11:227-256.

U.S. Appl. No. 17/041,447, Non-Final Office Action mailed Sep. 1, 2023; Inventor Ozcan, Aydogan et al.; 8 pages.

U.S. Appl. No. 17/261,542, Non-Final Office Action mailed May 9, 2023; Inventor Ozcan, Aydogan et al.; 13 pages.

U.S. Appl. No. 17/261,542, Non-Final Office Action mailed Nov. 9, 2023; Inventor Ozcan, Aydogan et al.; 12 pages.

U.S. Appl. No. 17/783,260, Non-Final Office Action mailed Sep. 5, 2024; Inventor Ozcan, Aydogan et al.; 9 pages.

U.S. Appl. No. 18/319,843, Non-Final Office Action mailed Mar. 24, 2025; Inventor De Haan, Kevin et al.; 34 pages.

U.S. Appl. No. 18/319,843, Non-Final Office Action mailed Oct. 16, 2025; Inventor De Haan, Kevin et al.; 31 pages.

U.S. Appl. No. 18/543,168, Non-Final Office Action mailed Jun. 26, 2024; Inventor Ozcan, Aydogan et al.; 8 pages.

U.S. Appl. No. 18/543,168, Non-Final Office Action mailed Oct. 16, 2024; Inventor Ozcan, Aydogan et al.; 13 pages.

U.S. Appl. No. 17/041,447, Notice of Allowance mailed Nov. 29, 2023; Inventor Ozcan, Aydogan et al.; 10 pages.

U.S. Appl. No. 17/261,542, Notice of Allowance mailed Jul. 23, 2024; Inventor Ozcan, Aydogan et al.; 9 pages.

U.S. Appl. No. 17/783,260, Notice of Allowance mailed Jan. 21, 2025; Inventor Ozcan, Aydogan et al.; 10 pages.

U.S. Appl. No. 18/543,168, Notice of Allowance mailed Feb. 12, 2025; Inventor Ozcan, Aydogan et al.; 5 pages.

Ozan Oktay et al., "Attention U-Net: Learning Where to Look for the Pancreas" arXiv:1804.03999v3 [cs.CV] May 20, 2018, 10 pages.

Pan et al., "A Survey on Transfer Learning" IEEE Transactions on Knowledge and Data Engineering, vol. 22, No. 10, Oct. 1, 2010, pp. 1345-1359.

PCT Application No. PCT/US2019/025014, International Search Report and Written Opinion mailed Jun. 11, 2019; Applicant The Regents of the University of California; 9 pages.

Pool, "Virtual Staining Set to Reduce Need for Skin Biopsies" Nov. 19, 2021, [retrieved on Sep. 15, 2022]. Retrieved from the Internet: URL: https://analyticalscience.wiley.com/do/10.1002/was. 00020445, pp. 1-4.

(56) References Cited

OTHER PUBLICATIONS

Rana et al., "Computational Histological Staining and Destaining of Prostate Core Biopsy RGB Images with Generative Adversarial Neural Networks" 2018 17th IEEE International Conference on Machine Learning and Applications (ICMLA) (Dec. 2018); IEEE, pp. 828-834.

Rivenson et al., "Deep learning enhanced mobile-phone microscopy" arXiv:1712.04139 [cs.LG] (Dec. 2017) 31 pages.

Rivenson et al., "Deep Learning Microscopy" Optica (Nov. 2017); 4(11):1437-1443.

Rivenson et al., "Deep learning-based virtual histology staining using auto-fluorescence of label-free tissue" Nature Biomedical Engineering (Jun. 2019), https://arxiv.org/abs/1803.11293, 22 pages.

Rivenson et al., "Emerging Advances to Transform Histopathology Using Virtual Staining" BME Front. (Aug. 25, 2020); 2020:9647163, 11 pages.

Rivenson et al., "Phase recovery and holographic image reconstruction using deep learning in neural networks" Light Sci Appl. (Feb. 23, 2018); 7:17141, 9 pages.

Rivenson et al., "PhaseStain: the Digital Staining of Label-free Quantitative Phase Microscopy Images Using Deep Learning" Light Sci Appl. (Feb. 6, 2019); 8:23, 11 pages.

Rivenson et al., "Virtual Histological Staining of Unlabelled Tissue-autofluorescence Images via Deep Learning" Nat Biomed Eng. (Jun. 2019); 3(6):466-477.

Ronneberger et al., "U-Net: Convolutional Networks for Biomedical Image Segmentation" arXiv:1505.04597v1 [cs. 3V] May 18, 2015, 8 pages.

Sandfort et al., "Data Augmentation Using Generative Adversarial Networks (CycleGAN) To Improve Generalizability in Ct Segmentation Tasks" Sci Rep. (Nov. 15, 2019); 9(1):16884, 9 pages.

Schindelin et al., "Fiji: an open-source platform for biological-image analysis" Nat. Methods (Jun. 2012); 9:676-682.

Shen et al., "Methodology Development for Predicting Subcellular Localization and Other Attributes of Proteins" Expert Rev Proteomics. (Aug. 2007); 4(4):453-463.

Shimobaba et al., "Convolutional Neural Network-based Regression for Depth Prediction in Digital Holography" arXiv:1802. 00664v1 [cs.CV] Feb. 2, 2018, 4 pages.

Sinha et al., "Lensless Computational Imaging Through Deep Learning" Optica, vol. 4, No. 9, Sep. 2017, pp. 1117-1125.

Syed, Jihad, et al., "Multiplex Immunohistochemistry: The Importance of Staining Order When Producing a Validated Protocol" Immunotherapy (Los Angel), (Dec. 2019); vol. 5, Issue 2, No. 1000157; pp. 1-99.

Tao et al., "Assessment of breast pathologies using nonlinear microscopy" Proc Natl Acad Sci USA. (Oct. 28, 2014); 111(43):15304-15309.

Taylor-Weiner et al., "A Machine Learning Approach Enables Quantitative Measurement of Liver Histology and Disease Monitoring in Nash" Hepatology (Jul. 2021); 74(1):133-147.

Thevenaz et al., "A Pyramid Approach to Subpixel Registration Based on Intensity" IEEE Trans Image Process. (Jan. 1998); 7(1):27-41.

Torr et al., "MLESAC: A New Robust Estimator with Application to Estimating Image Geometry" Computer Vision and Image Understanding (Apr. 2000); 78:138-156.

Tu et al., "Stain-free histopathology by programmable supercontinuum pulses" Nat Photonics. (Aug. 2016); 10(8):534-540.

Vakoc et al., "Three-dimensional Microscopy of the Tumor Microenvironment in Vivo Using Optical Frequency Domain Imaging" Nat Med. (Oct. 2009); 15(10):1219-1223.

Wang et al., "Deep Learning Enables Cross-modality Super-resolution in Fluorescence Microscopy" Nat Methods. (Jan. 2019); 16(1):103-110.

Wang et al., "Multi-scale Structural Similarity for Image Quality Assessment" The Thirty-Seventh Asilomar Conference on Signals, Systems & Computers (Nov. 2003); 2:1398-1402.

Webb et al., "Statistical Pattern Recognition," Third Edition, Wiley (Oct. 2011) ISBN: 978-0-470-68227-2, pp. 1-30.

Weigert et al., "Isotropic Reconstruction of 3D Fluorescence Microscopy Images Using Convolutional Neural Networks" MICCAI 2017, Part II, LNCS 10434, pp. 126-134 (Apr. 5, 2017).

Witte et al., "Label-free Live Brain Imaging and Targeted Patching with Third-harmonic Generation Microscopy" Proc Natl Acad Sci USA. (Apr. 12, 2011);108(15):5970-5975.

Wu et al., "Extended depth of field in holographic image reconstruction using deep learning based auto-focusing and Phase recovery" arXiv1803.08138, Mar. 2018, 9 pages.

Wu et al., "Extended Depth-of-field in Holographic Imaging Using Deep-learning-based Autofocusing and Phase Recovery" Optica, vol. 5, No. 6, Jun. 2018, pp. 704-710.

Wu et al., "Three-dimensional Virtual Refocusing of Fluorescence Microscopy Images Using Deep Learning," Nature Methods (Dec. 2019); 16(12):1323-1331.

Xia et al., "Computationally-guided Development of a Stromal Inflammation Histologic Biomarker in Lung Squamous Cell Carcinoma" Sci Rep. (Mar 2, 2018); 8(1):3941, 13 pages.

Yang et al., "Deep Learning for Single Image Super-Resolution: A Brief Review" arXiv:1808.03344v1 Ics.CV] Aug. 3, 2018 (15 pages).

Zhang et al., "Accurate Color Imaging of Pathology Slides Using Holography and Absorbance Spectrum Estimation of Histochemical Stains" J Biophotonics. (Mar. 2019);12(3):e201800335, 12 pages.

Zhang et al., "Digital Synthesis of Histological Stains Using Micro-structured and Multiplexed Virtual Staining of Label-free Tissue" Light Sci Appl. (May 6, 2020); 9:78, 13 pages.

Zhang et al., "High-Throughput, Label-Free and Slide-Free Histological Imaging by Computational Microscopy and Unsupervised Learning" Adv. Sci. (Nov. 2022); 9:2102358, 14 pages.

Zhu et al., "Unpaired Image-to-Image Translation using Cycle-Consistent Adversarial Networks" arXiv:1703.10593v1 Ics.CV] Mar. 30, 2017 (18 pages).

Race et al., "Deep Learning-Based Annotation Transfer between Molecular Imaging Modalities: An Automated Workflow for Multimodal Data Integration" Anal Chem (Feb. 16, 2021); 93(6):3061-3071.

* cited by examiner

Color for 100 Hematoxylin
Color for 100 Hematoxylin
Color for 100 DAB

100

Color for 600 Hematoxylin
Color for 600 Hematoxylin
Color for 600 DAB

600

750

725

700

Red for 700
Yellow for 700
Green for 700
Blue for 700
Color for 750 Hematoxylin
Color for 750 Hematoxylin
Color for 750 DAB

900

916 — Display

902 — CPU

914 — Keyboard/Keypad

906

904 — Memory

908 — Mass Storage

910 — Input/Output Interface

912 — Network

SYSTEMS AND METHODS FOR TRAINING MACHINE LEARNING ON NOISY AND INACCURATE IMMUNOSTAINS

FIELD OF THE DISCLOSURE

The present disclosure relates to virtually stained models, and more specifically to refining a digitally scanned immunostaining slide such that a machine learning model can be trained to higher performance, in terms of accuracy and reproducibility for biomarker discovery, tissue-based research studies, and diagnostic tests.

BACKGROUND

Immunostaining analyses, such as immunofluorescence (IF) and immunohistochemistry (IHC) are frequently used for evaluation and diagnosis of various diseases, including cancer, by clinicians and researchers across many fields of medicine and biology. The immunostaining technique can identify specific types of molecules in a sample by using antibodies, and amplify its visual signals using dyes, including but not limited to fluorescence tags, fluorescence expressing proteins, and 3,3'-Diaminobenzidine (DAB). The resulting staining pattern can reflect the localization of the target molecules. Owing to its powerful molecular specificity, there is a growing demand for use of biomarker information to evaluate in situ protein expression in tumor tissues.

This technique, however, may result in more or less non-specific staining, granular staining due to aggregation and pre-analytics, imperfect staining, and color shading as it requires physical staining of each individual tissue sample. The variability of staining quality could mislead a diagnosis or research analysis, leading to potentially misleading medical decisions for future stages of treatment. More importantly, the inconsistent quality of staining and staining noise become a great challenge when one uses the staining as a ground truth label to train a virtual staining machine learning model.

SUMMARY

In view of the foregoing, there is a need in the art for clearing false positive immunostaining signals and noise, and methods to perfect incomplete staining.

In this regard, the subject disclosure relates to a method of refining virtually-stained image annotations. The method includes the step of separating an image of a stained tissue section into an image of a counterstain and an image of immunostaining visual signals via linear transformation. The method includes the step of identifying and segmenting nuclei in the image of the counterstain to produce an image of a refined counterstain with single-cell segments. Additionally, the method includes the step of comparing immunostaining visual signals in the single-cell segments of the image of the refined counterstain to a user-defined threshold to determine true positive cells. Thereafter, the method includes refining the image of the immunostaining visual signals to produce an image of refined immunostaining visual signals. The refining is based on the stained tissue section protein localization or morphology and the determined true positive cells. Lastly, the method includes the step of overlaying the image of the counterstain and the image of refined immunostaining visual signals to produce a refined virtually-stained image annotation.

In another embodiment, the counterstain may be selected from the group consisting of hematoxylin, Hoechst, and 4',6-diamidino-2-phenylindole (DAPI). Similarly, the immunostaining visual signal may be selected from the group consisting of fluorescence tags, fluorescence expressing proteins, and 3,3'-diaminobenzidine (DAB) stains.

In another embodiment, refining the image of the immunostaining visual signals may include burring, using a Gaussian filter, to simulate membrane staining. In yet another embodiment, overlaying the image of the refined counterstain on the image of refined immunostaining visual signals may include concatenating the image of the refined counterstain and the image of the immunostaining visual signals at a third dimension to produce a concatenation. Still, overlaying the image of the refined counterstain on the image of refined immunostaining visual signals may also include performing linear transformation to convert the concatenation to an image native color space for display purposes.

In yet another embodiment, comparing immunostaining visual signals to a user-defined threshold in the single-cell segments of the image of the refined counterstain may include totaling the number of pixels in the image of the immunostaining visual signals that have a immunostaining visual signal higher than 0 within each single-cell segment. Comparing immunostaining visual signals may also or alternatively include summing the immunostaining visual signal intensity within each single-cell segment, or analyzing the maximum intensity of immunostaining visual signal within each single-cell segment. Even further, comparing immunostaining visual signals may also or alternatively include defining true positive cells by dividing a total amount of immunostaining visual signal in a cell region by an area of segmentation region of the cell.

The method may further include the step of training a neural network to produce refined virtually-stained image annotations, an image of an unstained tissue section as an input into the neural network.

In a further embodiment, segmenting nuclei in the image of the counterstain may include dilating the nuclei to include cytoplasmic area.

The subject disclosure relates to a method of refining virtually-stained image annotations. The method includes the step of separating an image of a stained tissue section into an image of a counterstain and an image of immunostaining visual signals via linear transformation. The method includes the step of identifying and segmenting nuclei in the image of the counterstain to produce an image of a refined counterstain with single-cell segments. The method includes the step of comparing immunostaining visual signals in the single-cell segments of the image of the refined counterstain to a user-defined threshold to determine true positive cells. The method includes the step of refining the image of the immunostaining visual signals to produce an image of refined immunostaining visual signals, the image refining based on the stained tissue section protein localization or morphology and the determined true positive cells. Lastly, the method includes the step of training a neural network to produce refined virtually-stained image annotations, an image of an unstained tissue section as an input into the neural network.

The subject disclosure also relates to a method of refining virtually-stained image annotations. The method includes the step of separating an image of a stained tissue section via linear transformation into two separate stained channels. The two separate stained channels include an image of a counterstain and an image of 3,3'-diaminobenzidine (DAB) stain. The method includes the step of segmenting nuclei in the image of the counterstain to produce an image of single-cell segments. The method includes the step of comparing DAB signals of the image of single-cell segments to a threshold to determine true positive cells. The method includes the step of refining the image of the DAB stain depending on the determined true positive cells, producing an image of refined immunostaining visual signals. Lastly, the method includes the step of training a neural network to produce refined virtually-stained image annotations, the refined image of the immunostaining visual signals as an input into the neural network.

BRIEF DESCRIPTION OF THE DRAWINGS

Various aspects of the present disclosure are discussed herein with reference to the accompanying Figures. For simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure

DETAILED DESCRIPTION

Figure 1:
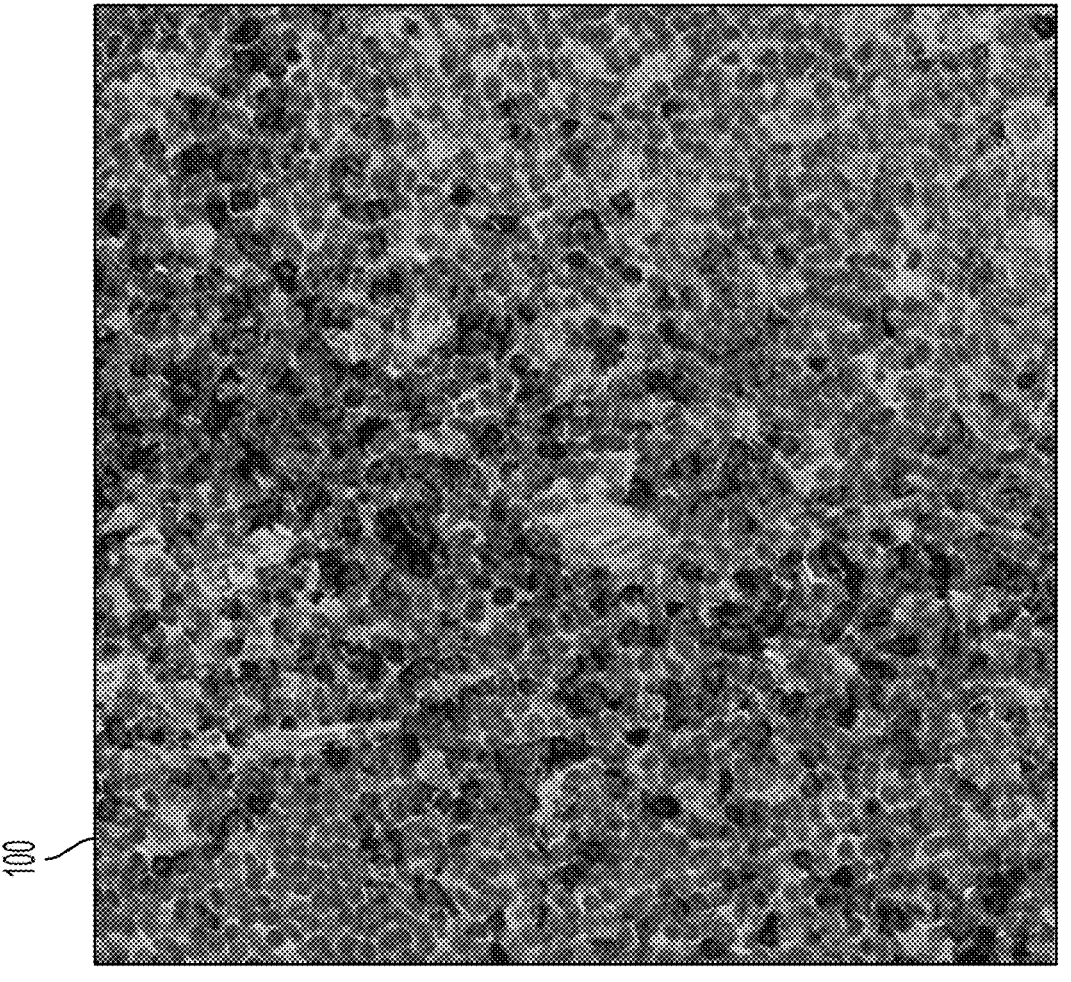
FIG. 1 shows an IHC stained tissue specimen according to the subject disclosure.

The subject technology overcomes many of the prior art problems associated with immunostaining analyses. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Presented herein is a framework to refine a digitally scanned immunostaining slide such that a machine learning model can be trained to higher performance, in terms of accuracy and reproducibility. This framework clears false positive immunostaining signals, noise, and perfects incomplete staining based on prior knowledge applied from relevant literature, and from biotechnical and medical professionals such as histotechnologists and histopathologists.

The workflow discussed herein promotes highly accurate virtual immunostaining. The following description discusses immunohistochemical (IHC) staining as an example to describe the workflow, however, the workflow is not limited to IHC, and can be applied to any immunostaining methods such as immunofluorescence staining.

Referring now to FIG. 1, an TIC stained tissue specimen 100 is shown. The principle discussed with reference to IHC stained tissue specimen 100 applies equally to an immuno-fluorescence-stained tissue specimen.

The IHC stained tissue specimen 100 slide is prepared following different protocols depending on the sample and purpose. For immunohistopathology, to avoid tissue degradation, a first step of preparing the TIC stained tissue specimen 100 may include fixing the tissue, which is completed usually by immersing the tissue in formalin. After, the tissue may be processed via dehydration, clearing, and infiltration with paraffin wax. Subsequently, the tissue proceeds to a refrigeration chamber in order to harden and form paraffin blocks. A microtome may then be used to slice the tissue block into 2-to-5-micron thickness sections, which may then be mounted on rectangular glass surfaces. The paraffin may be removed using solvent, which could be, for example, xylene or an equivalent.

Depending on what type of biomarkers are desired and what type of antibody cells are sought, different techniques and processes are implemented thereafter. After labeling of desired antibodies, the IHC stained tissue specimen 100 is imaged using a scanning microscope (usually using different frequencies of visible and invisible light such that different layers of the tissue may be detected through phenomenon such as simple reflection and/or auto-fluorescence, for example).

Specifically in the current setup, the IHC stained tissue specimen 100 of FIG. 1 is imaged using a Zeiss Axio Scan Z1 or Zeiss AxioScan 7 automated microscope, equipped with a Hamamatsu OrcaFlash camera. The magnification of the automated microscope is 20× with a numerical aperture of 0.8. The pixel resolution of the IHC stained tissue specimen 100 is 16 bits and sized 0.324 μm×0.324 μm. Modern microscopes contain digital cameras with different types of sensors (usually called CCD or CMOS sensors) and thus sensitivity and resolution can affect the quality and size of the IHC stained tissue specimen 100.

Figure 2:
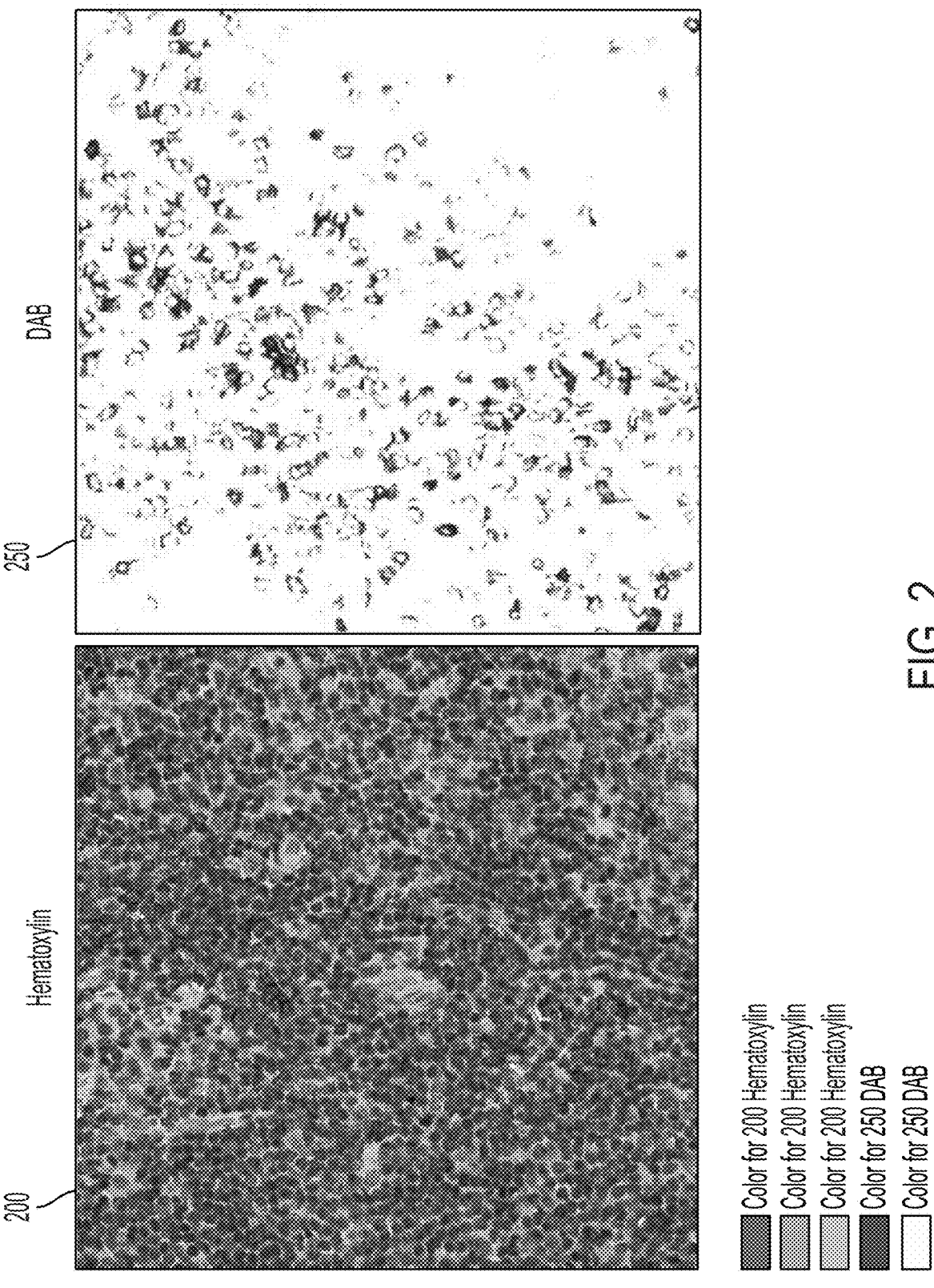
FIG. 2 shows the IHC stained tissue specimen of FIG. 1 separated into two channels, an image of a counterstain, and an image of immunostaining visual signals.

Referring now to FIG. 2, the IHC stained tissue specimen 100 of FIG. 1 is separated into an image of a counterstain 200, such as a hematoxylin stain which is used to stain cell nuclei, and an image of immunostaining visual signals 250, such as a 3,3'-diaminobenzidine (DAB) stain marking certain proteins or molecules. In an immunofluorescence application, the stained tissue specimen is separated into a counterstain and immunostaining visual signals 250 including fluorescence tags or fluorescence expressing proteins.

The stain separation is achieved by linear transformation. Linear transformation requires mapping between two vector spaces that preserves the operations of vector addition and scalar multiplication. The IHC stained tissue specimen 100 of FIG. 1 is a finite-dimensional vector space. Thus, multiplying the image of the IHC stained tissue specimen 100 in logarithmic scale by a 3×3 matrix yields an image of a counterstain 200 and an image of an immunostaining visual signals 250 separated in different channels.

In FIG. 2, the following 3×3 matrix was applied to the image of the IHC stained tissue specimen 100 in logarithmic scale, yielding the image of the counterstain 200 and the image of the immunostaining visual signals 250:

[1.88, −0.07, −0.60]
[−1.02, 1.13, −0.48]
[−0.55, −0.13, 1.57]

As a result, the manipulation of the image of the IHC stained tissue specimen 100 is the log(<original image>) multiplied by (<the 3×3 matrix provided supra>).

Figure 3:
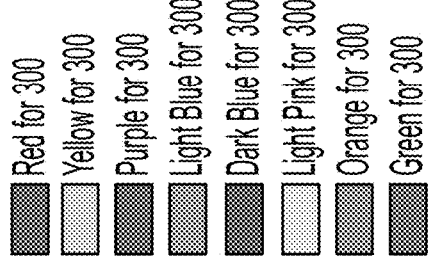
FIG. 3 shows an image of the counterstain of FIG. 2 refined such that each nuclei is identified and segmented.
Figure 3:
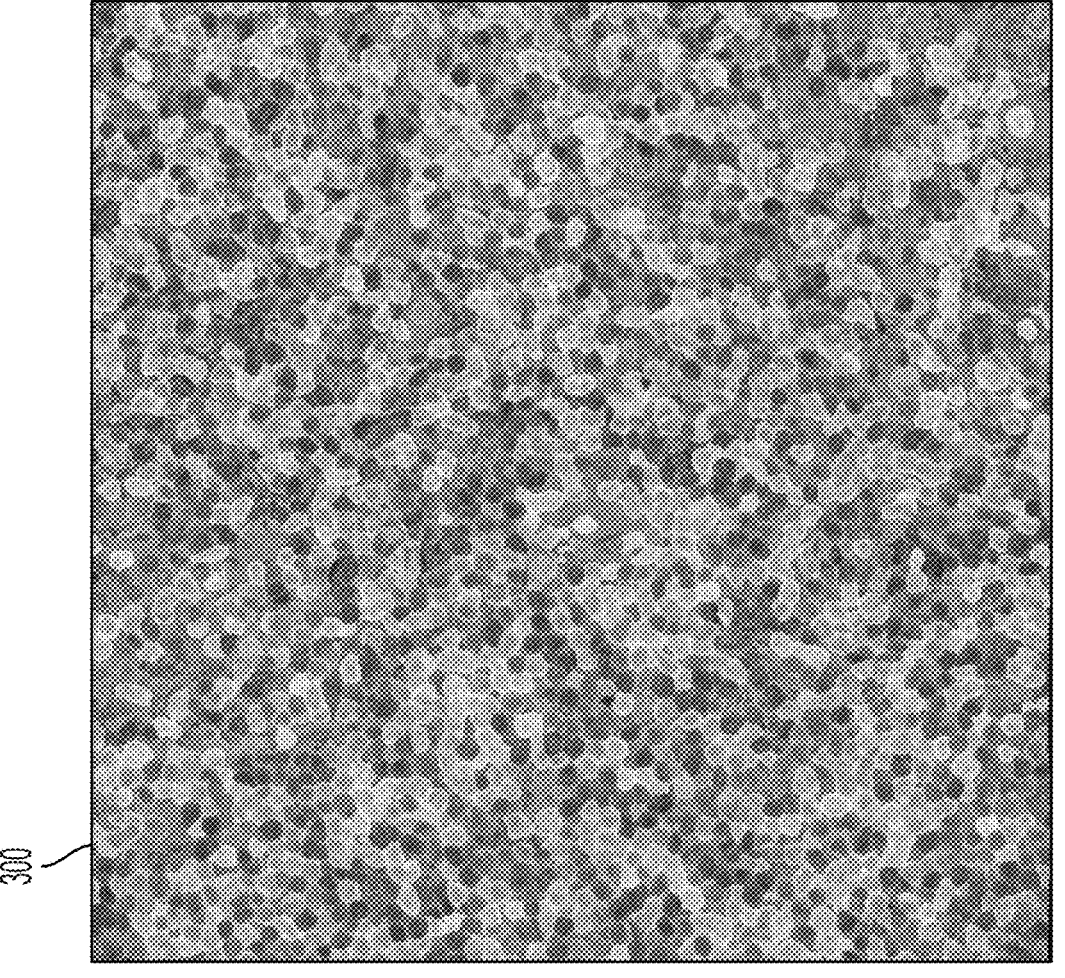

Referring now to FIG. 3, each nucleus in the image of the counterstain 200 is identified and segmented to produce an image of a refined counterstain 300 with single-cell segments. Each nucleus in the refined counterstain 300 is colored differently and dilated via a single or a series of morphological operators to include cytoplasmic area of each cell. The identification and segmentation may be completed by a deep learning-based segmentation algorithm such as Cellpose, which can precisely segment cells from a wide range of image types and does not require model retraining or parameter adjustments. See Stringer, C., Wang, T., Michaelos, M. et al. Cellpose: a generalist algorithm for cellular segmentation. *Nat Methods* 18, 100-106 (2021), the entirety of the reference is incorporated herein by reference for any purpose whatsoever.

Figure 4:
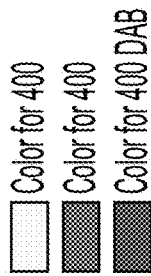
FIG. 4 portrays single cell segmentations of FIG. 3, overlayed with immunostaining visual signals of true positive cells.
Figure 4:
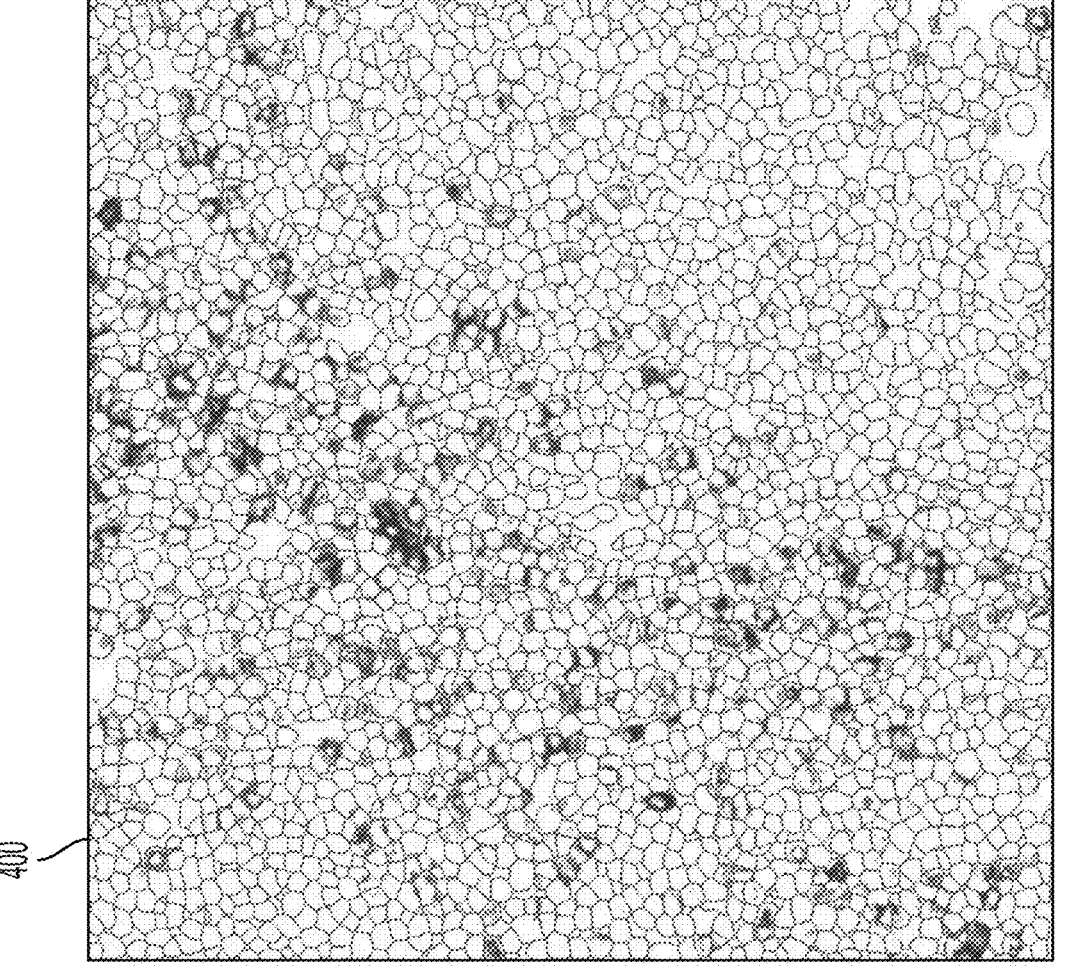

Referring now to FIG. 4, shown are silhouettes of single cell segmentations 400 overlayed with immunostaining visual signals of true positive cells. Each single cell segmentation of the refined counterstain 300 of FIG. 3 is extrapolated and immunostaining visual signals, such as DAB signals, of each single cell segmentation of the refined counterstain 300 is compared to a user-defined threshold, T, in order to determine true positive cells. Among the single cell segments, those that contain DAB signals higher than the user-defined threshold, T, are considered to be true positive cells.

There are multiple ways in setting the threshold, T, though each case is unique. For example, one can evaluate the amount of immunostaining visual signal by i) counting the number of pixels of refined counterstain 300 where immunostaining visual signals are higher than 0 within each segmentation region; ii) summing the immunostaining visual signal intensity within each segmentation region of refined counterstain 300; or iii) reading the maximum intensity of immunostaining visual signal within each segmentation region of refined counterstain 300. Thereafter, to determine positive cells, one can evaluate the a) the total amount of immunostaining visual signal in the cell's region; or <the total amount of immunostaining visual signal in the cell's region> divided by <the area of segmentation region of a single cell>.

In FIG. 4, in order to determine true positive cells, the ratio of DAB area over the whole cell area is considered. For this example, cells with DAB to cell area ratio over 20% are considered to be true positive cells.

Figure 5:
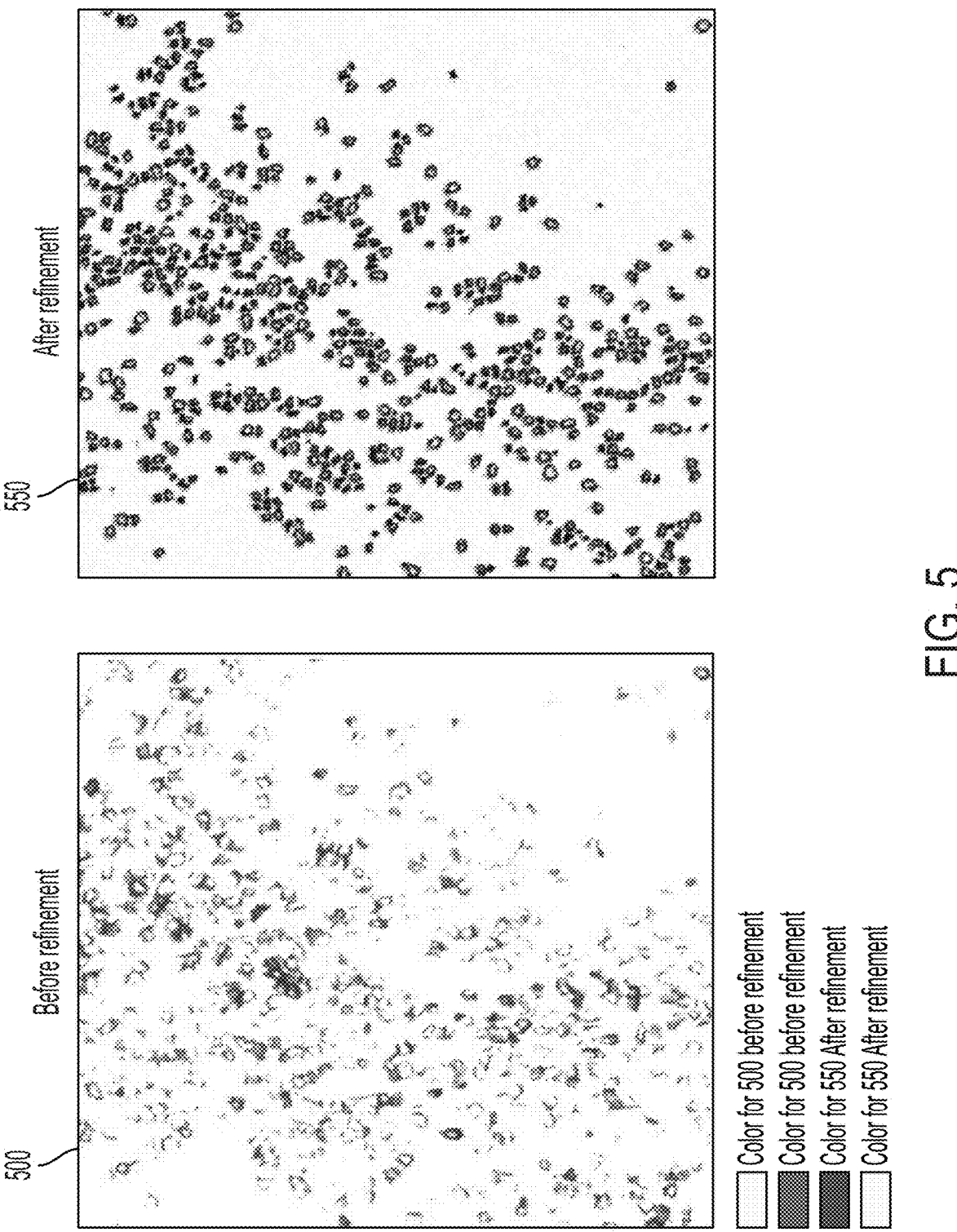
FIG. 5 illustrates the immunostaining visual signals of true positive cells of the single cell segmentations of FIGS. 3 and 4 refined based on prior knowledge about the target molecule.

Referring now to FIG. 5, the immunostaining visual signals 500, such as DAB signals, of true positive cells of the single cell segmentations of FIGS. 3 and 4 are refined based on prior knowledge about the target molecule. For example, a hypothetically "perfect stain" can be generated if a-priori knowledge about protein localization or morphology of the target molecule is known. In FIG. 5, the target molecule is known to be localized on the membrane. Therefore, a perimeter line of true positive cells of the single cell segmentations of FIGS. 3 and 4 is blurred using a conventional Gaussian filter to simulate membrane staining, yielding refined true positive cells 550. Gaussian filtering is a common technique in image processing utilized for several aims, including denoising and smoothening.

In the aforementioned example, the following Gaussian filter, 3×3 matrix was applied to the immunostaining visual signals 500 in logarithmic scale to simulate membrane staining:

[0.65, 0.70, 0.29]
[0.07, 0.99, 0.11]
[0.27, 0.57, 0.78]

It should be understood that the Gaussian filtering operation discussed with reference to FIG. 5 is not limited to membrane proteins. For example, if the target protein is known to be localized in the nucleus, immunostaining visual signals can be painted exclusively on the nucleus. If the target protein is known to be localized in the cytoplasmic area, immunostaining visual signals can be painted exclusively on the cytoplasmic area. Other staining patterns of additional cellular organelles are also applicable such as but not limited to the nucleolus, ribosome, vesicle, endoplasmic reticulum, Golgi apparatus, cytoskeleton, mitochondrion, vacuole, lysosome, centrosome, etc.

Figure 6:
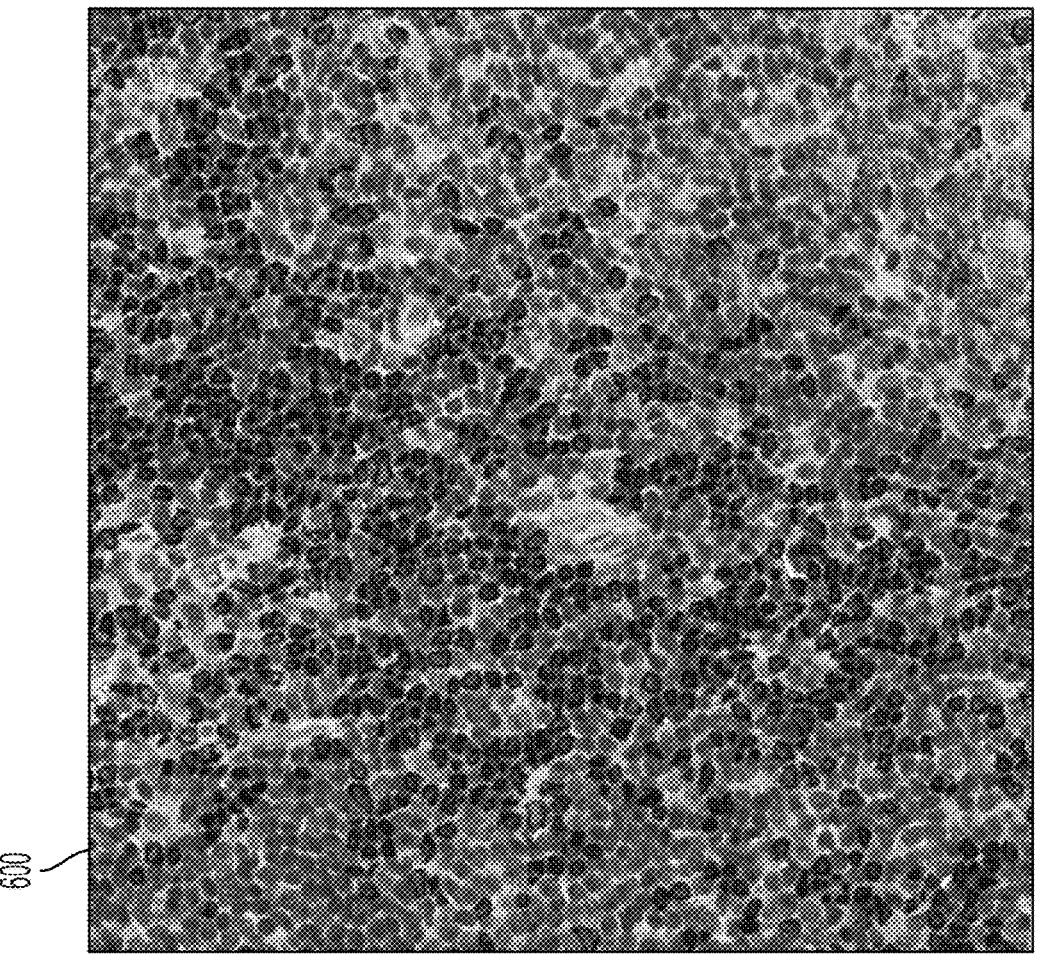
FIG. 6 shows the staining of the refined true positive cells of FIG. 5 overlayed with the counterstain of FIG. 2 to generate a final IHC/IF staining output.

Referring now to FIG. 6, the staining of refined true positive cells 550 of FIG. 5 is shown overlaid with counterstain 200 (e.g., DAPI, hematoxylin) to generate a final IHC/IF staining output 600. Specifically, the image of original counterstain staining 200 shown in FIG. 2 and the image of refined true positive cells 550 of FIG. 5 are concatenated at the 3$^{rd}$ dimension. Linear transformation is applied to convert the overlaid image to the image native color space, such as RGB (Red, Green, and Blue) color space, for display purposes to generate a final IHC/IF staining output 600. For example, since the (X, Y) position of each pixel detected within the image of the staining of refined true positive cells 550 is known, these pixels can then be colored with different intensity and therefore be "overlayed" onto counterstain 200.

Figure 7:
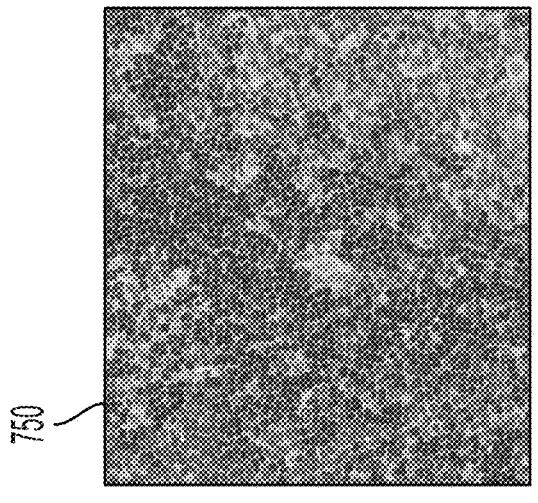
FIG. 7 shows the training of a neural network according to the subject disclosure.
Figure 7:
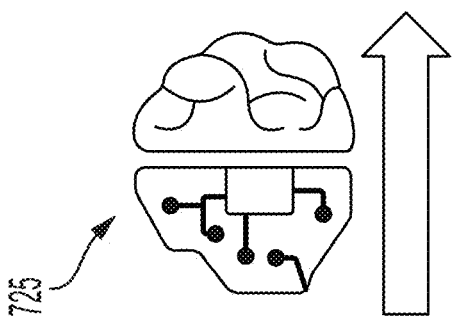
Figure 7:
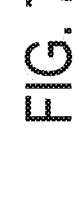
Figure 7:
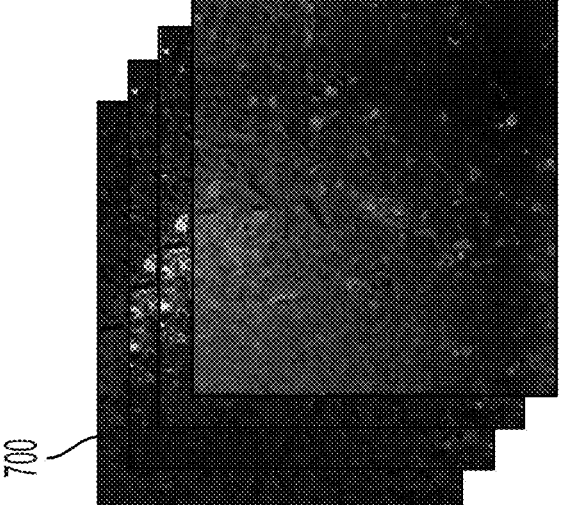

Referring now to FIG. 7, training of a neural network 725 is shown. The neural network 725 is designed and trained using, as an input, one of or a combination of: 1) an unstained tissue section 700; 2) a stained tissue section 100; 3) an image of a counterstain 200 of a stained tissue section; 4) an image of immunostaining visual signals of a stained tissue section 250; or 5) a final IHC/IF staining output 600. The neural network 725 is trained, from an aforementioned input to produce a final IHC/IF staining output 750, akin to the final IHC/IF staining output 600 of FIG. 6. Thus, the neural network is configured to circumvent false positive immunostaining signals, noise, and perfects incomplete staining.

Figure 8:
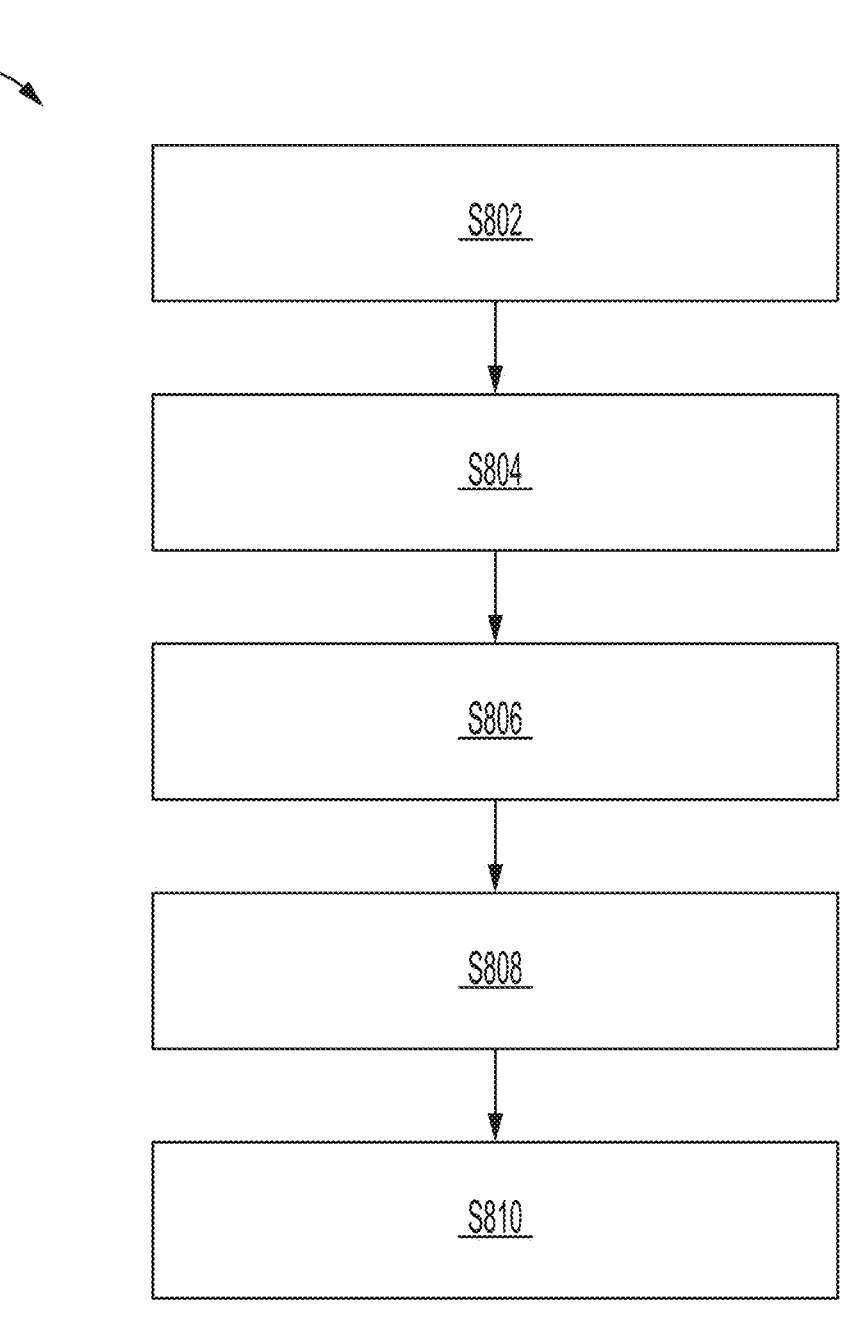
FIG. 8 displays a method for refining virtually-stained image annotations according to the subject disclosure.

Referring now to FIG. 8, a method 800 for refining virtually-stained image annotations is shown. According to the method, an image of a stained tissue section is first separated in step S802 into an image of a counterstain and an image of immunostaining visual signals via linear transformation. Subsequently, in step S804, nuclei are identified and segmented in the image of the counterstain to produce an image of a refined counterstain with single-cell segments. Next, immunostaining visual signals in the single-cell segments of the image of the refined counterstain are compared in step S806 to a user-defined threshold to determine true positive cells. In step S808, the image of the immunostaining visual signals is refined to produce an image of refined immunostaining visual signals. The refining is based on the stained tissue section protein localization or morphology and the determined true positive cells. Lastly, in step S810, the image of the counterstain and the image of refined immunostaining visual signals are overlayed to produce a refined virtually-stained image annotation.

Figure 9:
FIG. 9 is a block diagram of a computer system configured to perform processing associated with a neural network for refining virtually-stained image annotations as described herein.

Referring now to FIG. 9, FIG. 9 is block diagram of a computer system 900 configured to perform processing associated with the neural network for refining virtually-stained image annotations as described herein. The exemplary computer system 900 includes a central processing unit (CPU) 902, a memory 904, and an interconnect bus 906. The CPU 902 may include a single microprocessor or a plurality of microprocessors or special purpose processors for configuring computer system 900 as a multi-processor system. The memory 904 illustratively includes a main memory and a read only memory. The computer 900 also includes the mass storage device 908 having, for example, various disk drives, tape drives, etc. The memory 904 also includes dynamic random-access memory (DRAM) and high-speed cache memory. In operation, memory 904 stores at least portions of instructions and data for execution by the CPU 902. The memory 904 may also contain compute elements, such as Deep In-Memory Architectures (DIMA), wherein data is sent to memory and a function of the data (e.g., matrix vector multiplication) is read out by the CPU 902.

The mass storage 908 may include one or more magnetic disk, optical disk drives, and/or solid state memories, for storing data and instructions for use by the CPU 902. At least one component of the mass storage system 908, preferably in the form of a non-volatile disk drive, solid state, or tape drive, stores the database used for processing data and controlling functions of the neural network for refining virtually-stained image annotations. The mass storage system 908 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 200.

The computer system 900 may also include one or more input/output interfaces for communications, shown by way of example, as interface 910 and/or a transceiver for data communications via the network 912. The data interface 910 may be a modem, an Ethernet card, or any other suitable data communications device. To provide the functions of a processor running the neural network for refining virtually-stained image annotations, the data interface 910 may provide a relatively high-speed link to a network 912, such as an intranet, internet, Aegis network, or the Internet, either directly or through another external interface. The communication link to the network 912 may be, for example, optical, wired, or wireless (e.g., via satellite or cellular network). The computer system 900 may also connect via the data interface 910 and network 912 to at least one other computer system to perform remote or distributed multi-sensor processing related to, for example, a common operational picture (COP). Alternatively, the computer system 900 may include a mainframe or other type of host computer system capable of Web-based communications via the network 912. The computer system 900 may include software for operating a network application such as a web server and/or web client.

The computer system 900 may also include suitable input/output ports, that may interface with a portable data storage device, or use the interconnect bus 906 for interconnection with a local display 916 and keyboard 914 or the like serving as a local user interface for programming and/or data retrieval purposes. The display 916 may include a touch screen capability to enable users to interface with the system 900 by touching portions of the surface of the display 916. Server operations personnel may interact with the system 900 for controlling and/or programming the system from remote terminal devices via the network 912.

The computer system 900 may run a variety of application programs and store associated data in a database of mass storage system 908. One or more such applications may include a neural network for refining virtually-stained image annotations such as described with respect to FIGS. 1-8.

The components contained in the computer system 900 may enable the computer system to be used as a server, workstation, personal computer, network terminal, mobile computing device, mobile telephone, System on a Chip (SoC), and the like. The system 900 may include software and/or hardware that implements a web server application. The web server application may include software such as HTML, XML, WML, SGML, PUP (Hypertext Preprocessor), CGI, and like languages.

The foregoing features of the disclosure may be realized as a software component operating in the system 900 where the system 900 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high-level language including, without limitation, JavaScript, Java, CSS, Python, Keras, TensorFlow, PUP, Ruby, C++, C, Shell, C#, Objective-C, Go, R, TeX, VimL, Perl, Scala, CoffeeScript, Emacs Lisp, Swift, Fortran, or Visual BASIC. Certain script-based programs may be employed such as XML, WML, PUP, and so on. The system 200 may use a digital signal processor (DSP).

As stated previously, the mass storage 908 may include a database. The database may be any suitable database system, including the commercially available Microsoft Access database, and can be a local or distributed database system. A database system may implement Sybase and/or a SQL Server. The database may be supported by any suitable persistent data memory, such as a hard disk drive, RAID system, tape drive system, floppy diskette, or any other suitable system. The system 900 may include a database that is integrated with the neural network for refining virtually-stained image annotations, however, it will be understood that, in other implementations, the database and mass storage 908 can be an external element.

In certain implementations, the system 900 may include an Internet browser program and/or be configured operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the neural network includes a network-based, e.g., Internet-based, application that may be configured and run on the system 900 and/or any combination of the other components of the neural network for refining virtually-stained image annotations. The computer system 900 may include a web server running a Web 2.0 application or the like. Web applications running on the neural network may use server-side dynamic content generation mechanisms such, without limitation, Java servlets, CGI, PUP, or ASP. In certain implementations, mashed content may be generated by a web browser running, for example, client-side scripting including, without limitation, JavaScript and/or applets on a wireless device.

In certain implementations, the neural network for refining virtually-stained image annotations or computer system 900 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The neural network for refining virtually-stained image annotations, computer system 900, or another component of neural network may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements shown as distinct for purposes of illustration can be incorporated within other functional elements in a particular embodiment.

While the subject technology has been described with respect to various embodiments, those skilled in the art will readily appreciate that various changes and/or modifications can be made to the subject technology without departing from the scope of the present disclosure.

What is claimed is:

1. A method of refining virtually-stained image annotations, the method comprising:

separating an image of a stained tissue section into an image of a counterstain and an image of immunostaining visual signals via linear transformation;

identifying and segmenting nuclei in the image of the counterstain to produce an image of a refined counterstain with single-cell segments;

comparing immunostaining visual signals in the single-cell segments of the image of the refined counterstain to a user-defined threshold to determine true positive cells, wherein the comparing comprises summing an immunostaining visual signal intensity within each single-cell segment;

refining the image of the immunostaining visual signals to produce an image of refined immunostaining visual signals, the refining based on the stained tissue section protein localization or morphology and the determined true positive cells; and overlaying the image of the counterstain and the image of refined immunostaining visual signals to produce a refined virtually-stained image annotation.

2. The method of claim 1, wherein the counterstain is selected from the group consisting of hematoxylin, Hoechst, and 4',6-diamidino-2-phenylindole (DAPI).

3. The method of claim 1, wherein refining the image of the immunostaining visual signals includes blurring, using a Gaussian filter, to simulate membrane, cytoplasmic, or nuclei staining.

4. The method of claim 1, further comprising training a neural network to produce refined virtually-stained image annotations, an image of an unstained tissue section as an input into the neural network.

5. The method of claim 1, wherein overlaying the image of the refined counterstain the image of refined immunostaining visual signals comprises:

concatenating the image of the refined counterstain and the image of the immunostaining visual signals at a third dimension to produce a concatenation; and performing linear transformation to convert the concatenation to an image native color space for display purposes.

6. The method of claim 1, wherein comparing immunostaining visual signals to a user-defined threshold in the single-cell segments of the image of the refined counterstain further comprises:

totaling a number of pixels in the image of the immunostaining visual signals that have an immunostaining visual signal higher than 0 within each single-cell segment.

7. The method of claim 1, wherein comparing immunostaining visual signals to a user-defined threshold in the single-cell segments of the image of the refined counterstain further comprises:

analyzing the maximum intensity of immunostaining visual signal within each single-cell segment.

8. The method of claim 1, wherein comparing immunostaining visual signals to a user-defined threshold in the single-cell segments of the image of the refined counterstain further comprises:

defining true positive cells by dividing a total amount of immunostaining visual signal in a cell region by an area of segmentation region of the cell.

9. The method of claim 1, wherein segmenting nuclei in the image of the counterstain includes dilating the nuclei to include cytoplasmic area.

10. The method of claim 1, wherein the immunostaining visual signal is selected from the group consisting of fluorescence tags, fluorescence expressing proteins, and 3,3'-diaminobenzidine (DAB) stains.

11. The method of claim 1, wherein comparing the immunostaining visual signals to a user-defined threshold in the single-cell segments of the image of the refined counterstain further comprises:

defining true positive cells by dividing a total amount of the immunostaining visual signal in a cell region by an area of segmentation region of the cell.

12. A method of refining virtually-stained image annotations, the method comprising:

separating an image of a stained tissue section into an image of a counterstain and an image of immunostaining visual signals via linear transformation;

identifying and segmenting nuclei in the image of the counterstain to produce an image of a refined counterstain with single-cell segments;

comparing immunostaining visual signals in the single-cell segments of the image of the refined counterstain to a user-defined threshold to determine true positive cells, wherein the comparing comprises totaling a number of pixels in the image of the immunostaining visual signals that have an immunostaining visual signal higher than 0 within each single-cell segment;

refining the image of the immunostaining visual signals to produce an image of refined immunostaining visual signals, the image refining based on the stained tissue section protein localization or morphology and the determined true positive cells; and training a neural network to produce refined virtually-stained image annotations, an image of an unstained tissue section as an input into the neural network.

13. The method of claim 12, wherein the immunostaining visual signal is selected from the group consisting of fluorescence tags, fluorescence expressing proteins, and 3,3'-diaminobenzidine (DAB) stains.

14. The method of claim 12, wherein the counterstain is selected from the group consisting of hematoxylin, Hoechst, and 4',6-diamidino-2-phenylindole (DAPI).

15. The method of claim 12, wherein refining the image of the immunostaining visual signals includes burring, using a Gaussian filter, to simulate membrane, cytoplasmic, or nuclei staining.

16. The method of claim 12, wherein comparing the immunostaining visual signals to a user-defined threshold in the single-cell segments of the image of the refined counterstain further comprises:

summing the immunostaining visual signal intensities within each single-cell segment.

17. The method of claim 12, wherein comparing the immunostaining visual signals to a user-defined threshold in the single-cell segments of the image of the refined counterstain further comprises:

analyzing a maximum intensity of the immunostaining visual signals within each single-cell segment.

18. A method of refining virtually-stained image annotations, the method comprising:

separating an image of a stained tissue section via linear transformation into two separate stained channels, the two separate stained channels including an image of a counterstain and an image of 3,3'-diaminobenzidine (DAB) stain;

segmenting nuclei in the image of the counterstain to produce an image of single-cell segments;

comparing DAB signals of the image of single-cell segments to a threshold to determine true positive cells, wherein the comparing comprises analyzing a maximum intensity of the DAB signals within each single-cell segment;

refining the image of the DAB stain depending on the determined true positive cells, producing an image of refined immunostaining visual signals; and training a neural network to produce refined virtually-stained image annotations, the refined image of the immunostaining visual signals as an input into the neural network.

* * * * *